(12) United States Patent
Dearth et al.

(10) Patent No.: US 6,443,268 B1
(45) Date of Patent: Sep. 3, 2002

(54) BRAKING SYSTEM FOR A WHEELCHAIR

(76) Inventors: William Dearth, 7320 W. 114th St., Worth, IL (US) 60482; Jerry Phillips, 15742 Central Park Ave., Markham, IL (US) 60456

(*) Notice: Subject to any disclaimer, the term of this patent is extended or adjusted under 35 U.S.C. 154(b) by 0 days.

(21) Appl. No.: 09/849,327

(22) Filed: May 4, 2001

Related U.S. Application Data

(63) Continuation-in-part of application No. 09/220,033, filed on Dec. 23, 1998, now abandoned.

(51) Int. Cl.[7] ................................................. B06T 1/00
(52) U.S. Cl. .................. 188/2 F; 280/250.1; 280/304.1
(58) Field of Search ................. 188/2 F, 29; 280/250.1, 280/304.1; 297/DIG. 4

(56) References Cited

U.S. PATENT DOCUMENTS

| | | | |
|---|---|---|---|
| 4,101,143 A | | 7/1978 | Seiber .......................... 280/42 |
| 4,322,093 A | * | 3/1982 | Otto ............................ 280/650 |
| 4,570,756 A | * | 2/1986 | Minnebraker et al. ....... 188/2 F |
| 4,786,072 A | * | 11/1988 | Girvin ................... 297/DIG. 4 |
| 4,809,818 A | | 3/1989 | Leggett ...................... 188/2 F |
| 4,887,830 A | | 12/1989 | Fought .................... 280/304.1 |
| 5,036,959 A | | 8/1991 | Sarro ......................... 188/2 F |
| 337,289 A | | 7/1993 | Constantine ............... D12/131 |
| 5,346,039 A | | 9/1994 | Pfisterer ..................... 188/2 F |
| 5,358,266 A | | 10/1994 | Roth ....................... 280/304.1 |
| 5,472,066 A | | 12/1995 | Schillo ........................ 188/2 F |

OTHER PUBLICATIONS

*NEWS Release*, "Whoa!! Driver Control Of The Wheels", Jan. 28, 1999.
Brochure, UNI–BRAKE, Product #4618, Dec. 14, 1998.
Letter and attachment, dated Jan. 18, 1999, Re: #4618 UNI–BRAKE, First Manufacturing Contacts.
Letter and attachment, dated Aug. 4, 1999, Re: #4618 UNI–BRAKE, Second Manufacturing Contacts.
Letter and attachment, dated Oct. 15, 1999, Re: #4618 UNI–BRAKE, Third Manufacturing Contacts.
Letter and attachment, dated Dec. 15, 1999, Re: #4618 UNI–BRAKE, Fourth Manufacturing Contacts.

* cited by examiner

*Primary Examiner*—Jack Lavinder
*Assistant Examiner*—Devon Kramer
(74) *Attorney, Agent, or Firm*—McAndrews, Held & Malloy, Ltd.

(57) ABSTRACT

The present invention relates to a braking system for a wheelchair through which a wheel chair occupant can apply the brakes to both wheels with one handle member, yet the braking system does not interfere with the foldability of the wheelchair. The present invention also relates to methods of modifying existing wheelchairs to provide such a braking system.

16 Claims, 2 Drawing Sheets

BRAKING SYSTEM FOR A WHEELCHAIR

CROSS-REFERENCE TO RELATED APPLICATIONS

The present application is a continuation-in-part of U.S. application Ser. No. 09/220,033, filed on Dec. 23, 1998 now abandoned.

FIELD OF THE INVENTION

The present invention relates to a braking system for a wheelchair through which a wheelchair occupant can apply the brakes to both wheels with one hand, yet the braking system does not interfere with the foldability of the wheelchair. The present invention also relates to methods of modifying existing wheelchairs to provide such a braking system.

BACKGROUND OF THE INVENTION

Most wheelchairs are equipped with a brake assembly for each wheel. Such brake assemblies are usually hand operated by the occupant of the wheelchair. While effective, if the wheelchair occupant does not have the use of both hands at a certain time, the occupant will only be able to apply a brake to one of the wheels thereby causing an imbalance in the wheelchair.

The use of wheelchair brake assemblies is known in the art. By way of example, U.S. Pat. No. 5,036,959 to Sarro discloses a wheelchair with a braking assembly that can be operated by an attendant pushing a person in the wheelchair. U.S. Pat. No. 5,346,039 to Pfisterer discloses a wheelchair brake that includes first and second brake levers for use by a wheelchair user. U.S. Pat. No. 5,472,066 to Schillo et al. discloses an arresting brake for a wheelchair. U.S. Pat. No. 4,887,830 to Fought et al. discloses a wheelchair with combined wheel lock and hill holder which includes three modes of operation. U.S. Pat. No. 4,691,933 to Strauss discloses a wheelchair parking brake which precludes rotation of the wheels. U.S. Pat. No. 4,570,756 to Minnebraker et al. discloses a brake device for wheelchairs. Strauss discloses a wheelchair parking brake which precludes rotation of the wheels. U.S. Pat. No. 4,101,143 to Sieber discloses wheelchairs having frame members formed of foamed plastic. U.S. Pat. No. Des. 337,289 to Constantine et al. discloses the ornamental design for a wheelchair.

While these devices fulfill their respective particular objectives and requirements, the aforementioned patents do not describe a braking system for a wheelchair for allowing a wheelchair occupant the ability to apply brakes to both wheels of the wheelchair with one hand.

Other patents purport to disclose systems for operating both brakes of a wheelchair when one brake is activated. For example, U.S. Pat. No. 4,809,818 discloses a wheelchair lock device which attaches to both wheelchair hand brakes, thereby activating both brakes when one brake is activated, and which folds when used with a folding wheelchair. The wheelchair lock device includes a dual braking structure 39 consisting of two rods 14 and 24, pivotally attached to center section 46 by pins 28 and 44. Thus, the dual braking structure has multiple hinges which must all be securely extended for the wheel lock device to operate and must all be correctly folded in order to fold the wheelchair.

As another example, U.S. Pat. No. 4,786,072 to Girvin discloses a collapsible wheelchair and lift assembly, and provides a brake assembly that is said to be of conventional construction. The assembly comprises a pair of braking elements that pivot to engage the treads of the wheels. The left braking element is integrally formed with a rod (not shown) which is said to extend to the right side of the wheelchair, where it is also integrally attached to the right braking element, so that it pivots with the left braking element. Since the rod is integrally formed with the left and right braking elements, it is not removable or separable from those braking elements, and thus it would appear that the rod is part of the wheelchair and/or braking elements as initially manufactured.

Another type of device for assisting those with ambulatory problems is described in U.S. Pat. No. 4,322,093 to Otto, which relates to a wheeled walking aid with a seat and a hand brake.

There remains a need for a wheelchair brake assembly that allows a wheelchair occupant to apply both brakes with one hand, yet does not interfere with the foldability or other desirable functions or capabilities of the wheelchair.

SUMMARY OF THE INVENTION

The present invention provides an improved braking system for a wheelchair. As such, the general purpose of the present invention is to provide a new and improved braking system for a wheelchair and methods for modifying an existing wheelchair, which allows a wheelchair occupant to apply both brakes with one hand or with one handle member, yet does not interfere with the foldability or other desirable functions or capabilities of the wheelchair.

The present invention comprises a pair of brake members coupled with respect to a frame of a wheelchair for selectively abutting opposed rear wheels thereof. A cross member extends between the pair of brake members underneath a seat of the wheelchair. The cross member is comprised of a pair of segments pivotally coupled together by a single hinge at interior ends thereof. Exterior ends of the segments couple with the wheel engagement members so that applying one of the brake members will apply the other brake member.

Each of the brake members generally includes a handle member having a central portion pivotally coupled with the tab. A lower end of the handle member has a bracket pivotally coupled thereto. An upper end of the handle member extends upwardly beyond the frame of the wheelchair. Each of the brake members has a wheel engaging member having an upper end pivotally coupled with the tab. A lower end of the wheel engaging member has a pad member disposed thereon for selectively abutting the wheels of the wheelchair. A central portion of the wheel engaging member is pivotally coupled with a free end of the bracket of the handle member whereby movement of the handle member facilitates lowering of the wheel engagement member.

Each of the brake members is securely fastened to the frame. Preferably, the brake member includes a collar which is or can be secured to the frame of the wheelchair. The collar has a tab extending downwardly therefrom.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved braking system for a wheelchair which has the advantages of the prior art wheelchair brake assemblies and not the disadvantages.

It is another object of the present invention to provide a new and improved braking system for a wheelchair which may be easily and efficiently manufactured and marketed.

It is a further object of the present invention to provide a new and improved braking system for a wheelchair which is of durable and reliable construction.

An even further object of the present invention is to provide a new and improved braking system for a wheelchair which is susceptible of a low cost of manufacture with regard to both materials and labor, and which accordingly is then susceptible of low prices of sale to the consuming public, thereby making such a braking system for a wheelchair economically available to the buying public.

Even still another object of the present invention is to provide a new and improved braking system for a wheelchair for allowing a wheelchair occupant the ability to apply brakes to both wheels of the wheelchair with one hand.

Lastly, it is an object of the present invention to provide a new and improved braking system for a wheelchair including a pair of brake members coupled with respect to a frame of a wheelchair for selectively abutting opposed rear wheels thereof. Each of the brake members has a wheel engaging member having a pad member disposed thereon for selectively abutting the wheels of the wheelchair. A cross member extends between the pair of brake members underneath a seat of the wheelchair.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENTS

Figure 1:
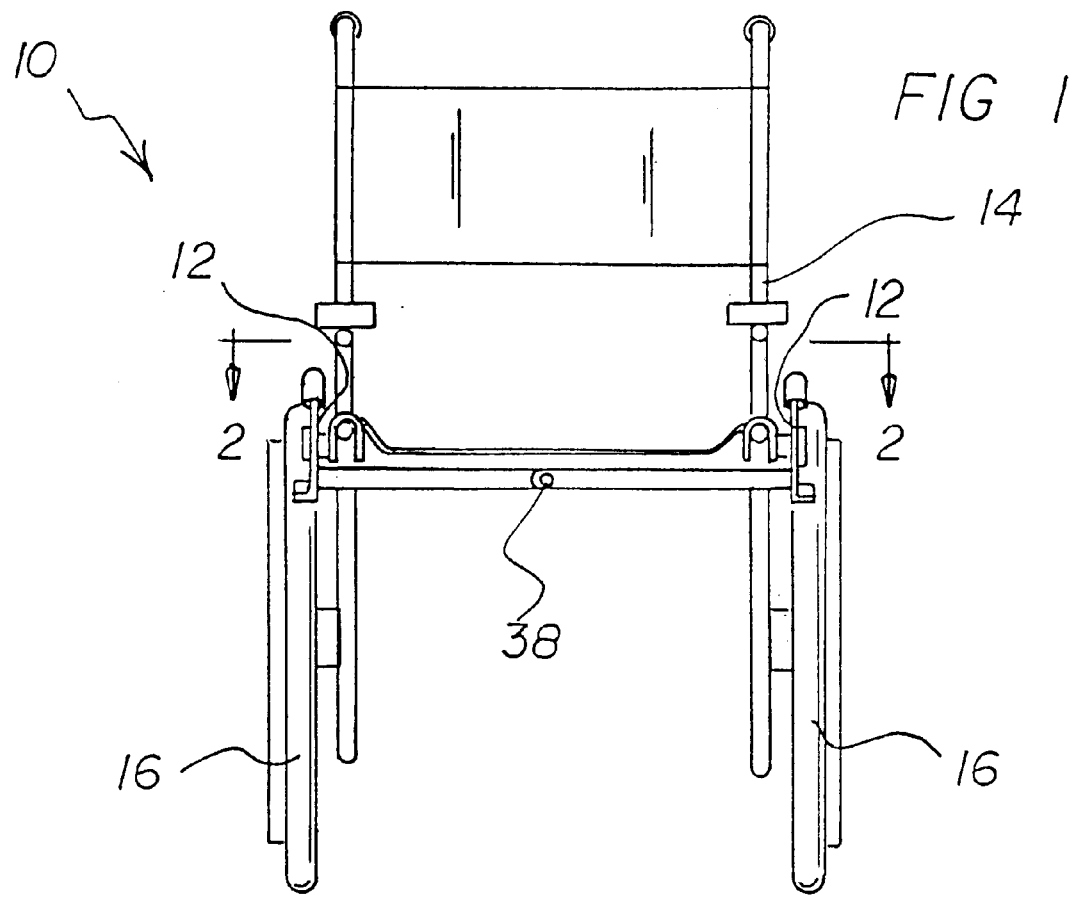
FIG. 1 is a perspective view of the preferred embodiment of the braking system for a wheelchair constructed in accordance with the principles of the present invention.

With reference now to the drawings, and in particular, to FIGS. 1 through 4 thereof, the preferred embodiment of the new and improved braking system for a wheelchair embodying the principles and concepts of the present invention and generally designated by the reference number 10 will be described.

Specifically, it will be noted in the various Figures that the device relates to a braking system for a wheelchair for allowing a wheelchair occupant the ability to apply brakes to both wheels of the wheelchair with one hand. In its broadest context, the device consists of a pair of brake members and a cross member. Such components are individually configured and correlated with respect to each other so as to attain the desired objective.

As one aspect of the present invention, an improved braking system is provided. The braking system is particularly suited for a foldable wheelchair. The braking system allows a wheelchair occupant to apply wheel engaging members to both wheels of the wheelchair with one hand, or otherwise to engage both wheel engaging members by moving only one handle member. A typical wheelchair comprises a frame, a seat suspended within the frame, at least two wheels attached to the frame, and a plurality of brake members attached to the frame. Each of the brake members comprises a handle member and a wheel engaging member adapted for selectively abutting one of said wheels.

In one embodiment, the present braking system comprises a pair of brake members 12 coupled to a frame 14 of a wheelchair for selectively abutting opposed rear wheels 16 thereof. Each of the brake members 12 may include a collar 18 secured to the frame 14 of the wheelchair. The collar 18 has a tab 20 extending downwardly therefrom. Each of the brake members 12 include a handle member 22 having a central portion pivotally coupled with the tab 20. A lower end 24 of the handle member 22 has a bracket 26 pivotally coupled thereto. An upper end 28 of the handle member 22 extends upwardly beyond the frame 14 of the wheelchair. Each of the brake members 12 has a wheel engaging member 30 having an upper end 32 pivotally coupled with the tab 20. A lower end 34 of the wheel engaging member 30 has a pad member 36 disposed thereon for selectively abutting the wheels 16 of the wheelchair. A central portion of the wheel engaging member 30 is pivotally coupled with a free end of the bracket 26 of the handle member 22 whereby movement of the handle member 22 facilitates lowering of the wheel engagement member 30.

A cross member 38 extends between the pair of brake members 12 underneath a seat 40 of the wheelchair. The cross member 38 is comprised of a pair of segments 42 pivotally coupled together at interior ends thereof. Exterior ends of the segments 42 couple with the wheel engagement members 30 whereby applying one of the brake members 12 will apply the other brake member 12. In some embodiments, the exterior ends are threaded, so that it can be securely threaded into an existing brake assembly. The threads may be on the outside of the cross member, so that the cross member screws into the brake member.

Alternatively, the threads may be within a hole defined by the cross member, so that a screw or other threaded item may be inserted through a hole defined by the brake member (preferably the wheel engaging member) and screwed into the threaded hole of the cross member. Alternatively, the exterior ends of the cross member may be fastened by a bolt or adhesive. The cross member may be any suitable stiff material, such as stainless steel.

Figure 2:
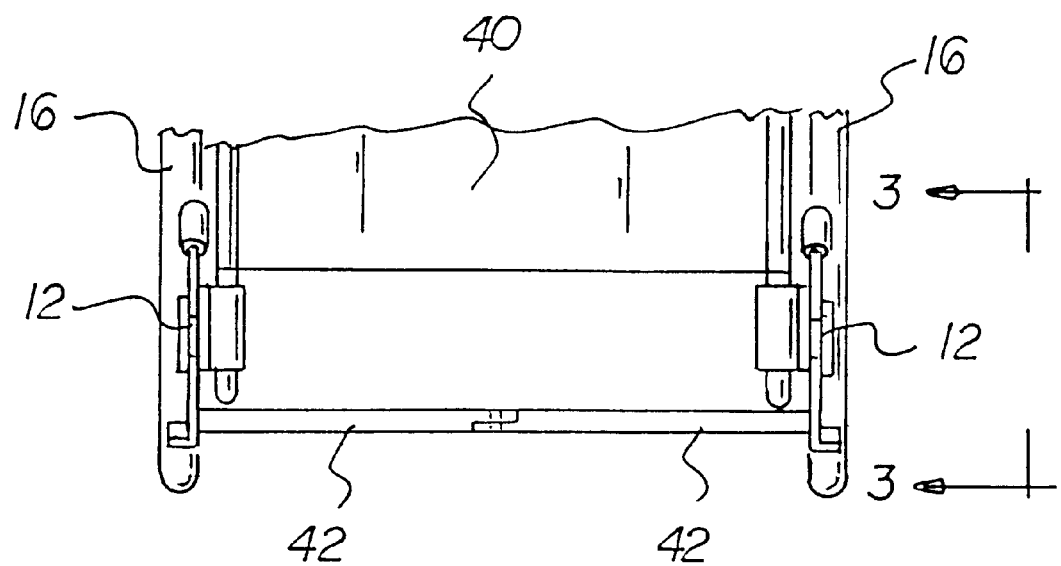
FIG. 2 is a cross-sectional view of the present invention as taken along line 2—2 of FIG. 1.
Figure 3:
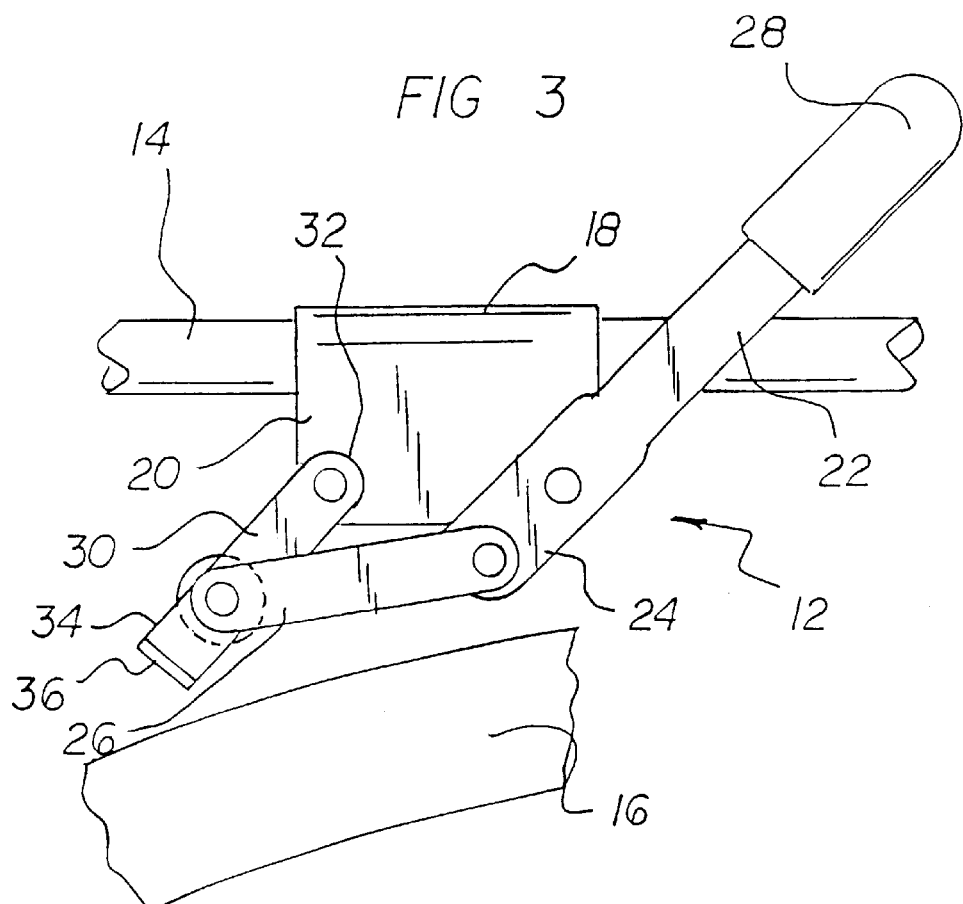
FIG. 3 is a side view of the present invention as taken along line 3—3 of FIG. 2.
Figure 4:
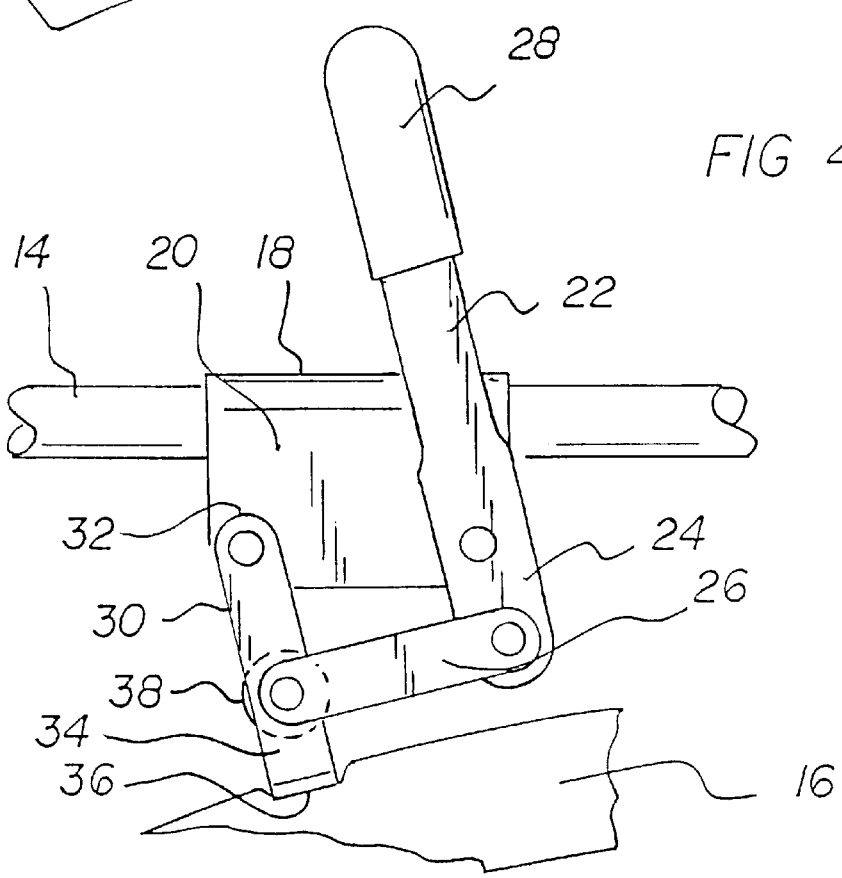
FIG. 4 is a side view of the present invention illustrated with the brake pads engaged to the wheels.

As is apparent from FIGS. 1 and 2, the cross member 38 has a single hinge, which is advantageous over the multi-hinged members of the prior art, particular U.S. Pat. No. 4,809,818. One advantage is that the single hinge facilitates folding of the wheelchair. When two hinges are present, they may fold in different directions and may require additional time and effort to make them fold in the desired fashion.

In preferred embodiments, the single hinge is designed so that it may be biased to fold upward, or so that it only folds upward and cannot fold downward. By providing a cross member with a single hinge that preferably folds upward, the foldability of the wheelchair is improved. When the seat is pulled upward, the cross member will fold upward also, so the wheelchair may be entirely or mostly folded by the single step of pulling the seat upward. Furthermore, a locking mechanism may be provided so that the single hinge will lock or be held in position, thereby providing additional stability to the wheelchair when in use. The hinge may include an internal mechanism for locking the hinge in position, for example, a button or tab that must be pushed in to unlock the hinge (as seen in child safety devices such as collapsible playpens with locking hinges). Alternatively, an external mechanism for locking the hinge may be provided, for example, a clip that slides over the hinge to prevent it from bending.

As another aspect of the present invention, a method is provided for modifying an existing wheelchair to have an improved brake system, or for installing an improved brake system on an existing wheelchair. The method is suitable for modifying an existing wheelchair that comprises a frame, a seat suspended within the frame, at least two wheels attached to the frame, and a plurality of brake members attached to the frame. Each of the brake members comprises a handle member and a wheel engaging member adapted for selectively abutting one of said wheels. The present method comprises providing a cross member comprising a single hinge and threaded ends. The cross member may have some or all of the characteristics of the cross member described above. Next, the present method comprises attaching the cross member to the brake members of the existing wheelchair. As a result, the attached cross member connects the brake members so that both brake members engage the wheels when a wheelchair occupant applies one brake member.

In other embodiments of the present method, the method may comprise providing a cross member attached to one or more other elements, such as to brake members, including a collar adapted to be placed on an existing wheelchair.

The present methods and braking system are economical in that they may be applied to an existing wheelchair and greatly improve its value. A existing wheelchair may be modified so that it is suitable for a new class of occupant. A manufacturer of wheelchairs or another equipment maker may provide, and an occupant may obtain, the present braking system at a relatively low price, compared to the price of a new wheelchair.

With respect to the above description then, it is to be realized that the optimum dimensional relationships for the parts of the invention, to include variations in size, materials, shape, form, function and the manner of operation, assembly and use, are deemed readily apparent to one skilled in the art, and all equivalent relationships to those illustrated in the drawings and described in the specification are intended to be encompassed by the present invention.

Therefore, since numerous modification and changes will readily occur to those skilled in the art, it is not desired to limit the invention to the exact construction and operation shown and described, and accordingly, all suitable modification and equivalents maybe resorted to, falling within the scope of the invention.

We claim:

1. A method of modifying an existing wheelchair, said wheelchair comprising a frame, a seat suspended within the frame, at least two wheels attached to the frame, and a plurality of brake members attached to the frame, each of said brake members comprising a handle member and a wheel engaging member adapted for selectively abutting one of said wheels, said method comprising:

(a) providing a cross member comprising a single hinge and exterior ends, wherein each of said exterior ends is adapted to couple with a brake member for attachment to an existing wheelchair, wherein step (a) comprises providing said cross member with a plurality of threaded exterior ends, and (b) attaching each of said exterior ends to brake member, wherein step (b) comprises threading each of said thread ends into an opening on said brake members, whereby the attached cross member connects the brake members so that both wheel engaging members engage the wheels when a wheelchair occupant applies one of said brake member.

2. The method of claim 1, wherein step (b) comprises threading said threaded exterior ends into an opening on said wheel engaging member.

3. The method of claim 1, wherein said opening is a pre-existing opening.

4. A method of modifying an existing wheelchair, said wheelchair comprising a frame, a seat suspended within the frame, at least two wheels attached to the frame, and a plurality of brake members attached to the frame, each of said brake members comprising a handle member and a wheel engaging member adapted for selectively abutting one of said wheels, said method comprising:

(a) providing a cross member comprising a single hinge and exterior ends, wherein each of said exterior ends is adapted to couple with a brake member for attachment to an existing wheelchair, (b) attaching each of said exterior ends to brake member, whereby the attached cross member connects the brake members so that both wheel engaging members engage the wheels when a wheelchair occupant applies one of said brake member, and said method further comprises the step of providing a locking mechanism for locking the hinge.

5. The method of claim 4, further comprising providing a pair of brake members attached to said cross member, said brake members each comprising a collar adapted to be placed on the frame of the existing wheelchair.

6. A braking system for a foldable wheelchair for allowing a wheelchair occupant to apply wheel engaging members to both wheels of the wheelchair with one handle member, said wheelchair comprising a frame, a seat suspended within the frame, at least two wheels attached to the frame, said braking system comprising:

- a pair of brake members, each of said brake members comprising a handle member and a wheel engaging member adapted for selectively abutting one wheel of a wheelchair, wherein said brake members are adapted to couple to a frame of the wheelchair,
- a cross member having a single hinge and exterior ends, wherein each of said exterior ends are adapted to couple with a brake member, and wherein said single hinge is adapted to only fold upward and
- wherein the cross member is connected to the brake members of a foldable wheelchair so that both brake members engage the wheels when a wheelchair occupant applies one brake member.

7. A wheelchair comprising the braking system of claim 6.

8. A braking system for a foldable wheelchair for allowing a wheelchair occupant to apply wheel engaging members to both wheels of the wheelchair with one handle member, said wheelchair comprising a frame, a seat suspended within the frame, at least two wheels attached to the frame, said braking system comprising:

- a pair of brake members, each of said brake members comprising a handle member and a wheel engaging member adapted for selectively abutting one wheel of a wheelchair, wherein said brake members are adapted to couple to a frame of the wheelchair,
- a cross member having a single hinge and exterior ends, wherein each of said exterior ends are adapted to couple with a brake member, and wherein the single hinge comprises a locking mechanism for locking the hinge and
- wherein the cross member is connected to the brake members of a foldable wheelchair so that both brake members engage the wheels when a wheelchair occupant applies one brake member.

9. The braking system of claim 8, wherein the locking mechanism is an internal mechanism.

10. The braking system of claim 8, wherein the locking mechanism is an external mechanism.

11. The braking system of claim 8, wherein said brake members each further comprise a collar secured to the frame of the wheelchair.

12. A wheelchair comprising the braking system of claim 8.

13. A braking system for a foldable wheelchair for allowing a wheelchair occupant to apply wheel engaging members to both wheels of the wheelchair with one handle member, said wheelchair comprising a frame, a seat suspended within the frame, at least two wheels attached to the frame, said braking system comprising:

- a pair of brake members, each of said brake members comprising a handle member and a wheel engaging member adapted for selectively abutting one wheel of a wheelchair, wherein said brake members are adapted to couple to a frame of the wheelchair,
- a cross member having a single hinge and exterior ends, wherein each of said exterior ends are adapted to couple with a brake member,
- wherein said cross member comprises threads disposed at the ends of the cross member, and
- wherein the cross member is connected to the brake members of a foldable wheelchair so that both brake members engage the wheels when a wheelchair occupant applies one brake member.

14. The braking system of claim 13, wherein said threads are on the exterior of the cross member.

15. A wheelchair comprising the braking system of claim 13.

16. A method of modifying an existing wheelchair, said wheelchair comprising a frame, a seat suspended within the frame, at least two wheels attached to the frame, and a plurality of brake members attached to the frame, each of said brake members comprising a handle member and a wheel engaging member adapted for selectively abutting one of said wheels, said method comprising:

(a) providing a cross member comprising a single hinge and exterior ends, wherein said single hinge is adapted to only fold upward, and wherein each of said exterior ends is adapted to couple with a brake member for attachment to an existing wheelchair, and (b) attaching each of said exterior ends to brake member, whereby the attached cross member connects the brake members so that both wheel engaging members engage the wheels when a wheelchair occupant applies one of said brake member.

* * * * *